United States Patent
Sarda

(10) Patent No.: US 11,061,432 B2
(45) Date of Patent: Jul. 13, 2021

(54) DATA HANDOFF BETWEEN TWO CLOCK DOMAINS SHARING A FUNDAMENTAL BEAT

(71) Applicant: Silicon Laboratories Inc., Austin, TX (US)

(72) Inventor: Vivek Sarda, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 22 days.

(21) Appl. No.: 16/693,559

(22) Filed: Nov. 25, 2019

(65) Prior Publication Data

US 2021/0157355 A1    May 27, 2021

(51) Int. Cl.
  *G06F 1/12*  (2006.01)
  *G06F 1/10*  (2006.01)
  *G06F 1/08*  (2006.01)

(52) U.S. Cl.
  CPC ............ *G06F 1/12* (2013.01); *G06F 1/08* (2013.01); *G06F 1/10* (2013.01)

(58) Field of Classification Search
  CPC ............ G06F 1/12; G06F 1/08; G06F 1/10
  See application file for complete search history.

(56) References Cited

U.S. PATENT DOCUMENTS

| | | | | |
|---|---|---|---|---|
| 5,509,038 | A * | 4/1996 | Wicki | H04L 7/0012 370/517 |
| 5,644,604 | A * | 7/1997 | Larson | H04L 7/0012 375/354 |
| 6,549,046 | B1 | 4/2003 | Klecka, III | |
| 6,839,858 | B1 | 1/2005 | James | |
| 6,885,647 | B1 | 4/2005 | Chung et al. | |
| 7,451,337 | B1 * | 11/2008 | Hewitt | G06F 1/10 713/400 |
| 7,535,893 | B1 | 5/2009 | Beladakere et al. | |
| 8,355,476 | B2 | 1/2013 | Lee | |

(Continued)

FOREIGN PATENT DOCUMENTS

WO    2015003364    1/2015

OTHER PUBLICATIONS

AN-1033, "Delay Variation Measurement and Compensation", Aplication Note, Renesas, Feb. 8, 2019 (Year: 2019).

(Continued)

*Primary Examiner* — Stefan Stoynov
(74) *Attorney, Agent, or Firm* — Zagorin Cave LLP

(57) ABSTRACT

A data handoff controller includes a counter coupled to supply a count value indicative of a skew between a first clock signal and a second clock signal. The first and second clock signal have a fundamental beat frequency. A greatest common factor circuit is used to determine the fundamental beat frequency and the second is reset based on the beat frequency. A sampling circuit samples first clock domain data with the second clock signal. The sampling circuit is controlled to sample, at least in part, based on the count value. The count value can be used to impose a blackout window in which data is not sampled to avoid sampling data around data transitions of the first clock domain data. The count value can also be used to select an edge of the second clock signal to use for sampling the first clock domain data to ensure first clock domain data is not sampled during data transitions.

20 Claims, 6 Drawing Sheets

(56) References Cited

U.S. PATENT DOCUMENTS

| | | |
|---|---|---|
| 8,942,561 B2 | 1/2015 | Boyd et al. |
| 9,246,615 B2 | 1/2016 | Ellegard et al. |
| 9,369,270 B1 | 6/2016 | Spijker |
| 9,426,762 B2 | 8/2016 | Ehlers et al. |
| 9,594,396 B2 | 3/2017 | Turner et al. |
| 9,860,004 B2 | 1/2018 | Joergensen |
| 10,075,284 B1 | 9/2018 | Rodrigues et al. |
| 10,084,559 B1 | 9/2018 | Devineni |
| 10,511,312 B1 | 12/2019 | Pastorello et al. |
| 10,536,258 B2 | 1/2020 | Choo et al. |
| 10,715,307 B1 | 7/2020 | Jin |
| 10,727,845 B1 | 7/2020 | Balakrishnan |
| 2008/0080563 A1 | 4/2008 | Kataria |
| 2008/0240169 A1 | 10/2008 | Cui et al. |
| 2009/0168808 A1 | 7/2009 | Cho |
| 2011/0296226 A1 | 12/2011 | Sorbara et al. |
| 2012/0319734 A1 | 12/2012 | Nagaraj |
| 2013/0121347 A1 | 5/2013 | Saito et al. |
| 2014/0068315 A1 | 3/2014 | Aweya et al. |
| 2014/0320181 A1 | 10/2014 | Mitric |
| 2015/0092797 A1 | 4/2015 | Aweya |
| 2015/0200770 A1 | 7/2015 | Rahbar et al. |
| 2015/0207620 A1 | 7/2015 | Colby |
| 2015/0222276 A1 | 8/2015 | Milijevic |
| 2017/0135053 A1 | 5/2017 | Shenoi et al. |
| 2019/0020333 A1 | 1/2019 | Koch et al. |
| 2019/0379474 A1 | 12/2019 | Coulter |
| 2019/0379475 A1 | 12/2019 | Seethamraju |
| 2020/0028666 A1 | 1/2020 | Goldin et al. |
| 2020/0127752 A1 | 4/2020 | Tai et al. |
| 2020/0285265 A1 | 9/2020 | Ranganathan et al. |

OTHER PUBLICATIONS

AN-950, "82P338XX/9XX Usage of a SYNC Input for Clock Alignment", Application Note, Renesas, Nov. 10, 2016 (Year: 2016).

Eidson, J., "IEEE-1588 Standard for a Precision Clock Synchronization Protocol for Networked Measurement and Control Systems," Agilent Technologies, 2005, 94 pages.

Gallant, D., "Practical Implementation of a IEEE 1588 Based Synchronization Distribution System," Silicon Laboratories, WSTS Jun. 19, 2018, 15 pages.

U.S. Appl. No. 16/836,713, filed Mar. 31, 2020, entitled "Secondary Phase Compensation Assist for PLL IO Delay Aligning Sync Signal to System Clock Signal," by Vivek Sarda.

U.S. Appl. No. 16/836,706, filed Mar. 31, 2020, entitled "Secondary Phase Compensation Assist for PLL IO Delay," by Vivek Sarda.

U.S. Appl. No. 16/849,036, filed Apr. 15, 2020, entitled Phase Transport with Frequency Translation Without a PLL, by inventor Vivek Sarda.

Broadcom Corp., "Ethernet Time Synchronization Providing Native Timing Within the Network," White Paper, Oct. 2008, 36 pages.

Renesas, "Synchronization Management Unit," 8A34002 Datasheet, Renesas Electronics Corporation, Sep. 8, 2020, 107 pages.

Stanton, K., 802.1AS Tutorial, Intel Corporation, Nov. 13, 2008, 42 pages.

* cited by examiner

US 11,061,432 B2

DATA HANDOFF BETWEEN TWO CLOCK DOMAINS SHARING A FUNDAMENTAL BEAT

BACKGROUND

Field of the Invention

This application relates to data transfers from one clock domain to another clock domain.

Description of the Related Art

Communication networks and systems use multiple clock signals having a known relationship so system components can reliably use the clock signals. One aspect of having multiple clock signals is the need to transfer data from a source clock domain to a destination clock domain. In general, the data transfer to the destination clock domain requires redundant handoffs or handshakes that delay the signal transfer and decrease the bandwidth of the interface between the two clock domains. One solution is to use a first in first out (FIFO) buffer to store the data using the source clock signal and retrieve the data from the FIFO with the destination clock signal. Improvements in accurate data transfer mechanisms would be desirable to reduce delay and errors.

SUMMARY OF EMBODIMENTS OF THE INVENTION

Accordingly, in one embodiment a method for transferring data between a first clock domain and a second clock domain includes receiving a first clock signal with a first frequency and a second clock signal with a second frequency. The first clock signal and the second clock signal share a fundamental beat frequency. The method further includes receiving first clock domain data that is synchronous with the first clock signal and supplying a count value from a counter indicative of a current skew between the first clock signal and the second clock signal, the counter resetting at the fundamental beat frequency. The first clock domain data is sampled using the second clock signal to generate second clock domain data, the sampling based, at least in part, on the count value.

In another embodiment an apparatus includes a greatest common factor detect circuit coupled to receive a first clock signal with a first frequency and a second clock signal with a second frequency and supply a greatest common factor signal indicative of a fundamental beat frequency shared between the first clock signal and the second clock signal. A counter is coupled to supply a count value indicative of a skew between the first clock signal and the second clock signal. A sampling circuit supplies second clock domain data. The sampling circuit is configured to sample first clock domain data with the second clock signal, the first clock domain data being synchronous with the first clock signal. The sampling circuit is controlled to sample, at least in part, based on the count value.

In another embodiment, a data handoff apparatus is provided that includes a counter coupled to supply a count value indicative of a skew between a first clock signal and a second clock signal, the first and second clock signal having a fundamental beat frequency. A sampling circuit supplies second clock domain data, the sampling circuit being configured to sample first clock domain data with the second clock signal, the first clock domain data being synchronous with the first clock signal. The sampling circuit is configured to sample the first clock domain data using a rising edge of the second clock signal responsive to a first value range of the count value and to sample the first clock domain data using a falling edge of the second clock signal responsive to a second value range of the count value.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Several terms describe characteristics of a pair of signals (or more than two signals). For example, "synchronous" refers to two or more signals that operate in unison with a shared base time interval. Plesiochronous is described by ITU-T standards as a pair of signals with the same "average" frequency but have a changing phase relationship. In a real world example plesiochronous signals can be, e.g., the same signals with variation through different filtering functions. Another way to describe plesiochronous signals is a pair of signals as that occur at nominally the same rate, with any variation in rate being constrained within specified limits. Signals with the same frequency but unknown phase relationship are referred to as mesochronous. Mesochronous signals can be considered as a mismatch between signals from the same source but through different path delays. Terms can also be used to describe a single signal. An isochronous signal is a signal that modulates around an average frequency such that the modulation frequency is related to the fundamental frequency. Finally, a beat or frame between two signals is a common base frequency (greatest common factor) between the pair of signals. For example, a first signal with a frequency of 156.25 MHz and a second signal with a frequency of 125 MHz have a common base frequency or beat of 31.25 MHz at which frequency the rising (or falling) edges of the first and second signals align.

Telecommunication systems that interface with other systems (wireless, internet protocol (IP), etc.) require a clear and precise way to handoff phase information to the other side that have clock frequencies that are different but share the same isochronous base frequency, e.g., 8 KHz. These clocks have a rational relationship through the base frequency. For example, a first clock signal with a frequency of 2.04 MHz (255×8 KHz) and a second clock signal with a frequency of 2.048 MHz (256×8 KHz) line up at period boundaries of the 8 KHz signal (every 125 µs). When data is handed off between the two systems, the exact phase relationship between the two clock domains is unknown and as pointed out above, the current data handoff techniques require redundant handoffs or handshakes that delay the signal transfer and decrease the bandwidth of the interface. The loss of phase information (edge relationships between the clock signals) results in a bit error rate and requires larger FIFO's that produce an undesired data delay and/or need for data correction.

Figure 1:
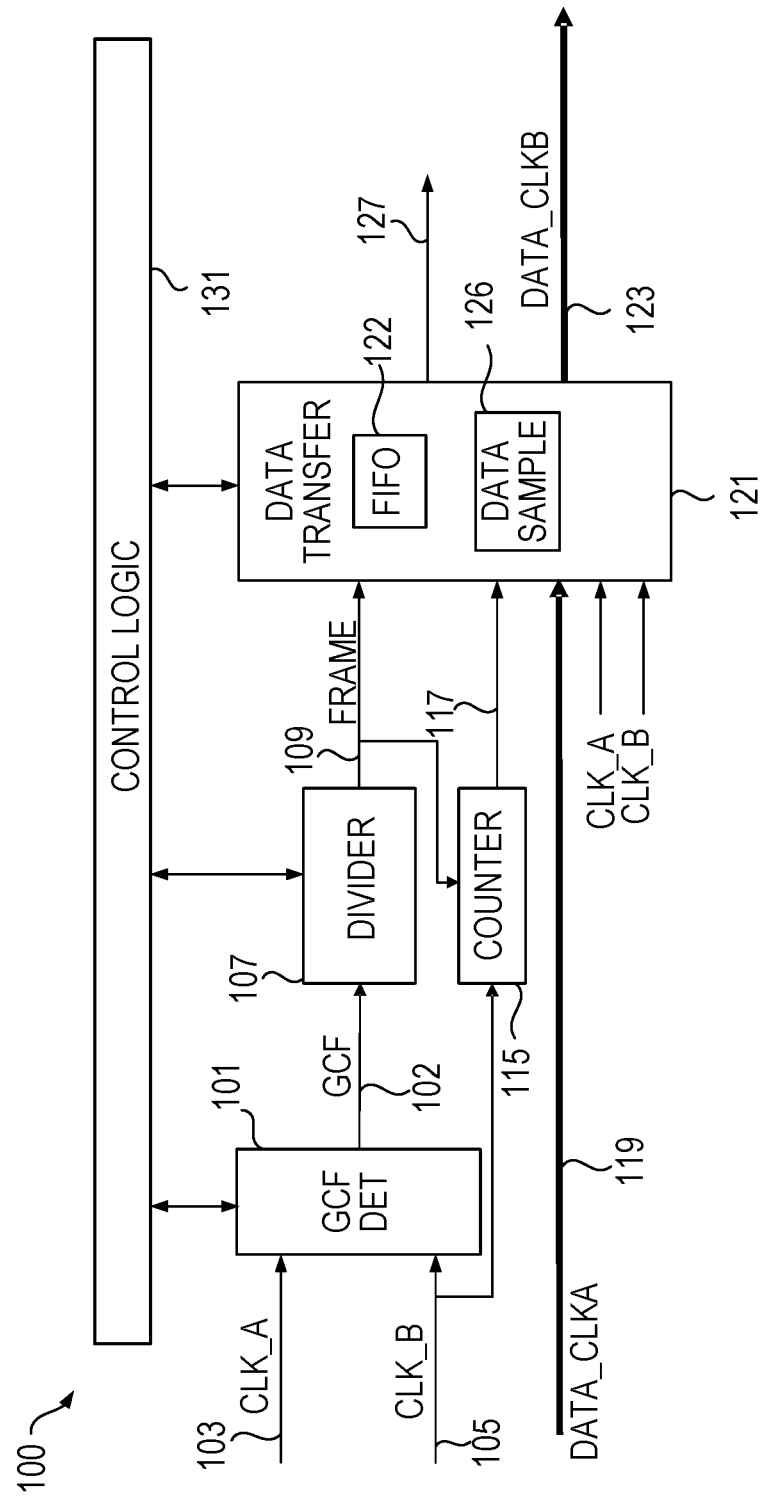
FIG. 1 illustrates a high level block diagram of a data handoff controller.
Figure 2:
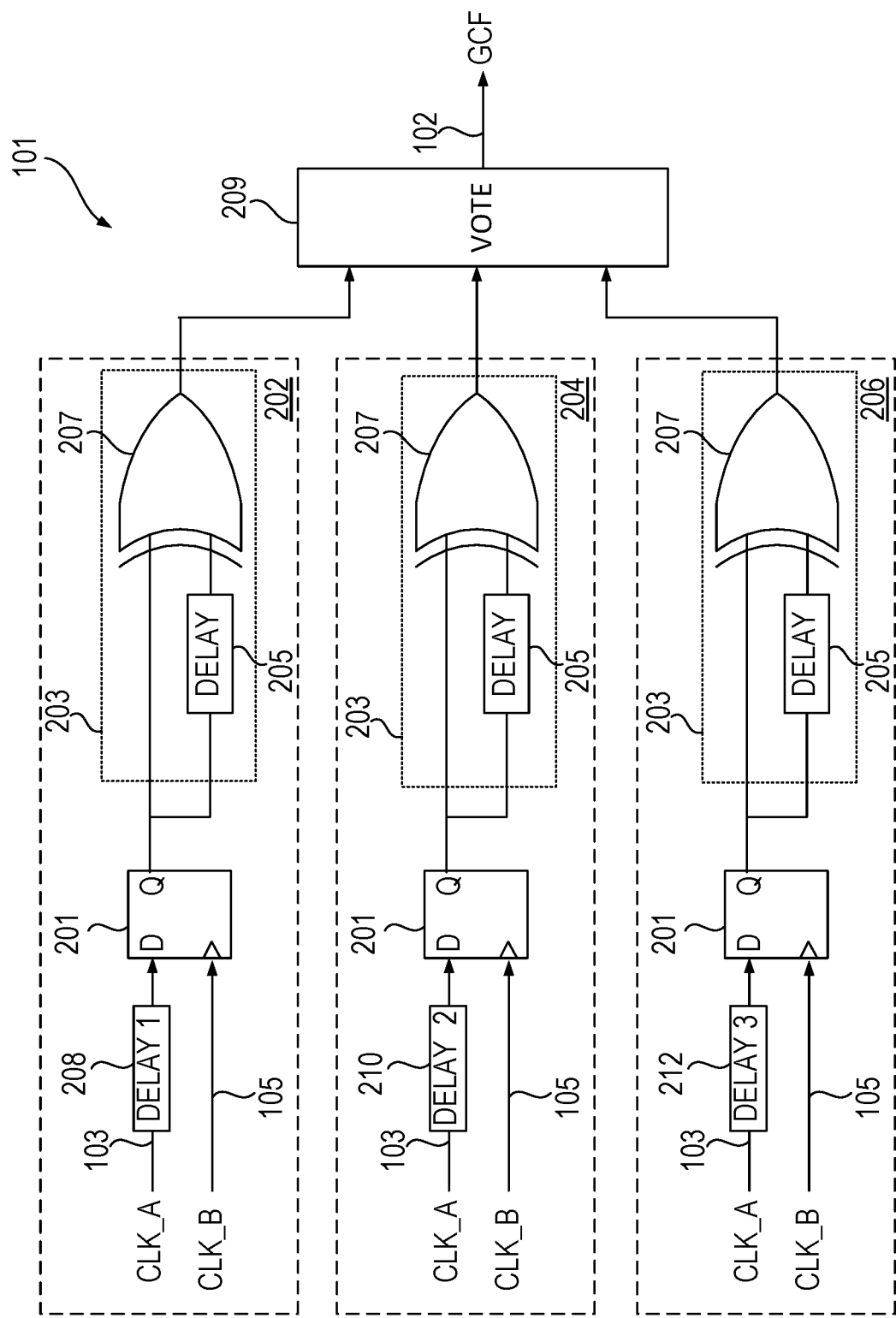
FIG. 2 illustrates an embodiment of a greatest common factor (GCF) detector.

It would be desirable to track the relationship between the two clock signals to facilitate data transfer between two clock domains with a reduced bit error rate and to synchronously transfer frames of data without losing data. Referring to FIG. 1, a data handoff controller 100 includes a greatest common factor (GCF) detector 101 that receives CLK_A 103 and CLK_B 105. In an exemplary embodiment, CLK_A has a frequency of 2.04 MHz and CLK_B has a frequency of 2.048 MHz, and CLK_A and CLK_B have a common beat frequency of 8 kHz. The GCF detector 101 supplies a GCF signal 102 indicative of the GCF clock frequency. Referring to FIG. 2, in an embodiment the GCF detector 101 includes three instances (202, 204, 206) of a flipflop 201 followed by an edge to pulse conversion circuit 203 that includes a delay block 205 and an XOR gate 207. Each instance includes a different delay 208, 210, 212 on the data (CLKA) of flip-flop 201. The delay could instead be inserted on the clock input. A voting circuit or other best of three circuit 209 receives the outputs from the instances of the XOR gates and selects the GCF output 102. In an embodiment, the voting circuit 209 selects the GCF output to be the value provided by at least two of the instances. The different delays 208, 210, 212 are chosen to help alleviate metastability concerns in that if a metastability issue shows up for one instance, the different delays make the outputs of the other instances more reliable. The flip-flop 201 functions as a lead/lag detector to determine whether CLK_A is leading or lagging CLK_B. A zero indicates CLK_A is lagging CLK_B and a one indicates CLK_A is leading CLK_B. When the lead/lag indicator changes from a one to a zero or vice versa, the pulse conversion circuit 203 generates a pulse that lasts for the length of DELAY 205.

Figure 3:
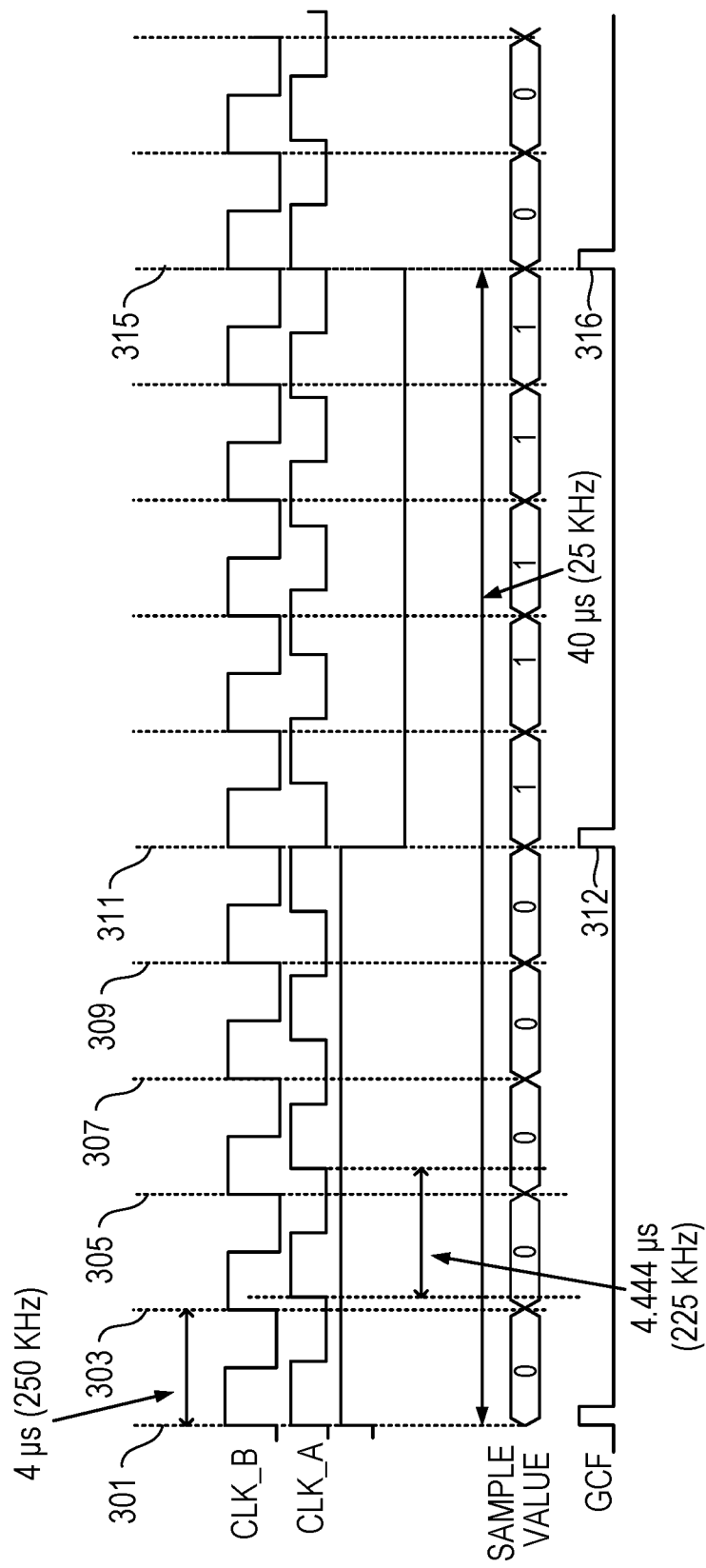
FIG. 3 is a timing diagram illustrating how two related clock signals with a common beat frequency relate to one another.

FIG. 3 illustrates how the GCF detector works with two clock signals with a common beat frequency. In the example of FIG. 3 CLK_B has a frequency of 250 kHz (period of 4 µs) and CLK_A has a frequency of 225 kHz (period of approximately 4.444 µs). The beat frequency is 25 KHz. Assume the rising edges of CLK_A and CLK_B coincide at 301 and assume CLK_B samples CLK_A as shown in FIG. 2. At 301, assume CLK_B samples a 0. FIG. 3 also shows the values sampled by CLK_B. The rising edge of CLK_B continues to sample CLK_A to be zero at 303, 305, 307, and 309 until the CLK_B samples a one at 311. The sampled value changing from a 0 to a 1 at 311. That transition is detected and results in generation of a GCF pulse at 312. As can be seen, the delta between the rising edge of CLK_B and the rising edge of CLK_A (with CLK_B leading CLK_A) grows larger for the first half of the 40 µs period of the 25 kHz beat frequency and then after 311, the rising edge of CLK_A leads the rising edge of CLK_B with the delta growing smaller until the rising edges again coincide at 315. Starting at 311, the sample value stays at 1 until a 0 is sampled at 315 resulting in another GCF pulse at 316. Thus, two GCF pulses occur each 40 µs period of the 25 kHz.

Figure 4:
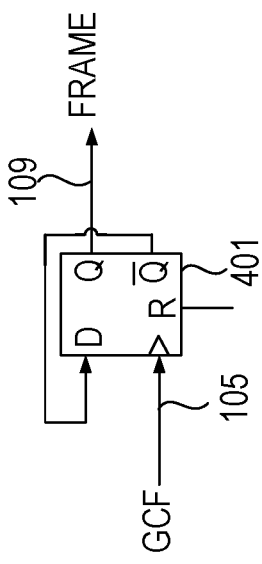
FIG. 4 illustrates an embodiment of a divider to generate a frame signal.

Referring again to FIG. 1, divider 107 can be used to clean up the GCF pulses into a frame signal 109. The divider can be implemented with a simple flip-flop as shown in FIG. 4. The divider indicates a frame signal 109 that is supplied to the data transfer block 121. In one embodiment the initial reset of flip-flop 401, based on event 311 (rising edge of CLK_B and falling edge of CLK_A aligned) causes frame 109 to assert from low to high when the rising edges of CLK_A and CLK_B align.

Still referring to FIG. 1, the data handoff controller 100 includes a counter 115 that is clocked by CLK_B 105 and supplies a count value 117 that indicates the phase relationship between CLK_A and CLK_B. The counter is reset by the frame signal 109 to a zero or another desired initial count value. FIG. 1 further shows that data transfer block 121 receives DATA_CLKA (clock A time domain data) 119, converts that data to the CLK_B time domain data and supplies CLK_B data 123 at the CLK_B frequency. The data transfer block 121 further includes a FIFO 122 and a data sample circuit 126, which are described further herein. In embodiments, the count value 117 indicates the current skew between the two clock signals and therefore can be used to determine an appropriate time for CLK_B to sample DATA_CLKA. For example, in an embodiment, the count value provides a windowing function determining when to sample. Assume CLK_B has a frequency of 256×8 kHZ (2.048 mHz) and counter 115 resets every 256 cycles of CLK_B on 8K boundaries corresponding to the frame signal. The counter value 117 can be used to determine a safe window during which the DATA_CLKA can be sampled by CLK_B. In an embodiment the control logic sets a blackout window where the edges of the two clock signals transition too close to one another.

Figure 5:
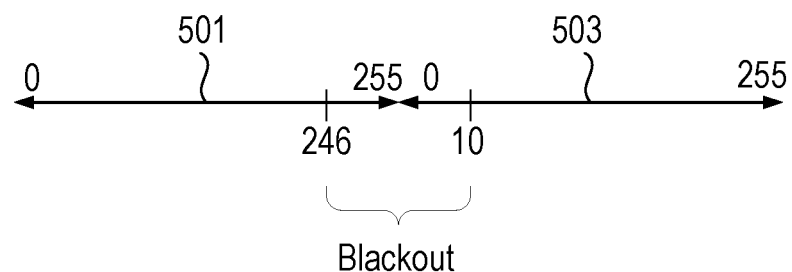
FIG. 5 illustrates use of a blackout period based on the counter value.

For example, referring to FIG. 5, the blackout window may be set to ensure that sampling occurs only when the rising edges of the clock signals are far enough apart to ensure no metastability issues and/or to ensure that old data is not sampled. The blackout window ensures that data transitions in the CLK_A clock domain do not occur around sampling edges of CLK_B. The embodiment of FIG. 5 assumes data transitions on the rising edges of the clock signals. FIG. 5 shows two periods 501 and 503 of the beat frequency and the blackout period occurs for a particular range of counter values, e.g., for counter values from 246 to 10. That would be close to where the rising edges of the two clock signals are aligned. If edges other than the rising edges are used for data transitions the blackout window can be adjusted. During the blackout window data from the A clock domain is written into the FIFO 122 in the data transfer block 121 by CLK_A and read by CLK_B. The FIFO 122 has separate read and write ports. Having to write data into and read data from the FIFO can slow data transfers during the blackout window. Assuming the CLK_B frequency is fast enough, all the DATA_CLKA written into the FIFO during the blackout window can be read by CLK_B during the blackout window and after the blackout window, CLK_B can directly sample DATA_CLKA, thereby avoiding having to use the FIFO for all data transfers and speeding up the interface. In an embodiment the frame signal 109 is used by data transfer block 121 to decide which clock edge to use for reading the FIFO.

Figure 6:
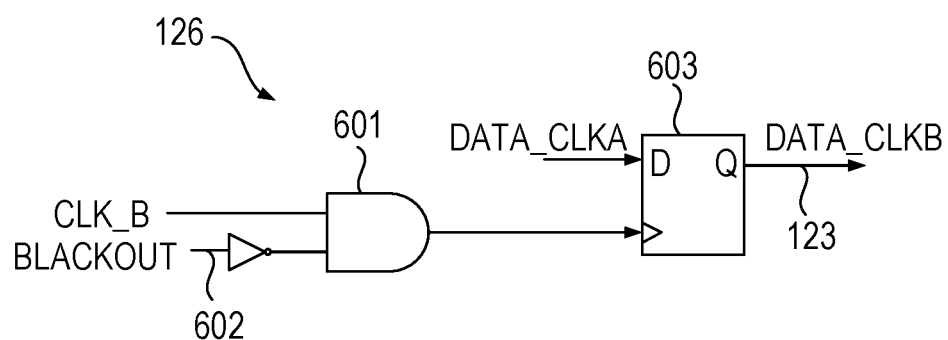
FIG. 6 illustrates an embodiment of a data sampling circuit that includes blackout capability.

FIG. 6 illustrates an embodiment of the data sample circuit 126 that includes an AND gate 601 that clock gates CLK_B when the blackout signal 602 is asserted. The blackout signal 602 is asserted when the count value is within the range assigned to the blackout window. When not in blackout window, the flip-flop 603 directly samples DATA_CLKA with CLK_B to generate DATA_CLKB 123. DATA_CLKB is also sourced from the FIFO when DATA_CLKA is present in the FIFO. While a single flip-flop 603 is shown, embodiments include the number of flip-flops that correspond to the width of DATA_CLKA.

Figure 7A:
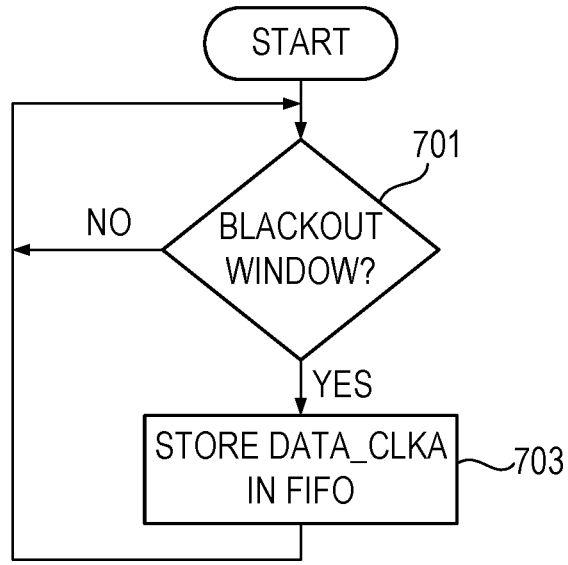
FIG. 7A illustrates an embodiment of a control flow for writing the FIFO.
Figure 7B:
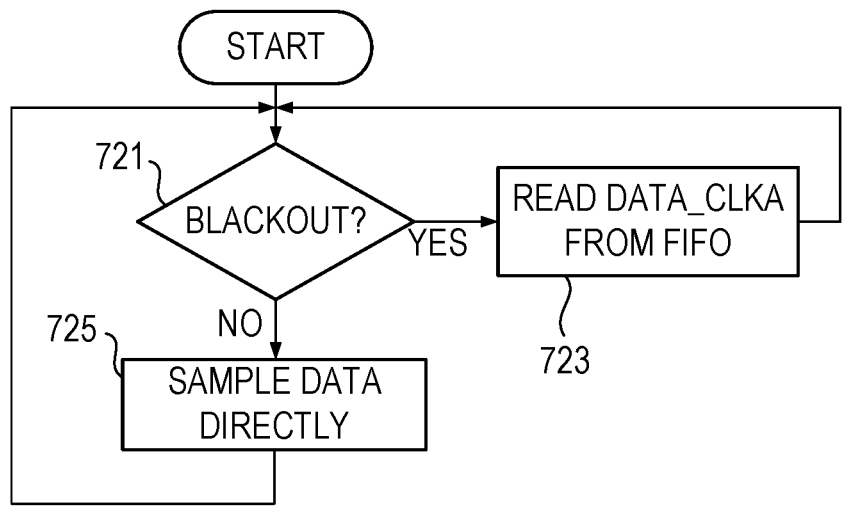
FIG. 7B illustrates an embodiment of a control flow for reading the FIFO.

FIGS. 7A and 7B illustrate high level flow diagrams associated with data transfer operations using a blackout window. FIG. 7A shows the control for writing DATA_CLKA into the FIFO using CLK_A. In 701 the control logic checks if the counter value indicates the blackout window. During the blackout window, DATA_CLKA is written to the FIFO in 703 and the system returns to checking for the blackout window in 701. If not in the blackout window, no data is written into the FIFO and the flow returns to checking for the blackout window. Assuming CLK_B is faster than CLK_A, the DATA_CLKA written into the FIFO during the blackout window will be read by CLK_B during the blackout window.

FIG. 7B illustrates a high level flow diagram for sampling DATA_CLKA from the FIFO or sampling directly depending on the blackout window. The control checks for the blackout period in 721. If count value indicates the blackout period in 721, DATA_CLKA is read from the FIFO in 723 and the control returns to 721 to check for the end of the blackout period. If the blackout period ends, flip-flop 603 samples DATA_CLKA directly using CLK_B in 725 and the control returns to check for the next blackout period. Directly sampling DATA_CLKA provides a faster interface. If there are underflows or overflows in the FIFO, error conditions, not shown in FIGS. 7A and 7B, can be reported.

Figure 8:
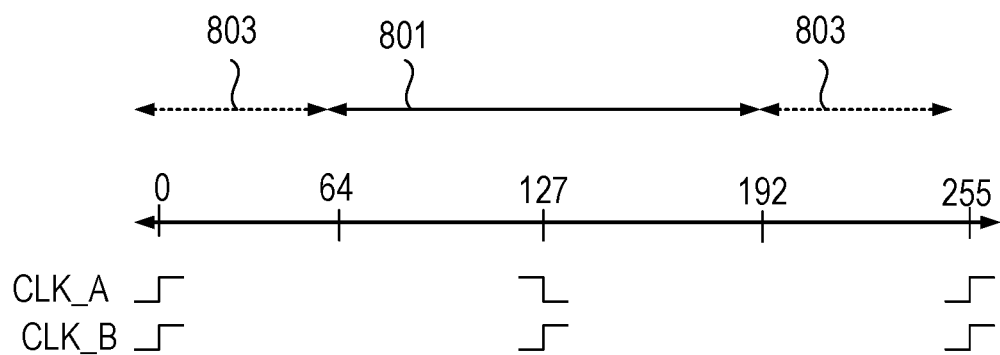
FIG. 8 illustrates use of an edge select circuit to select a clock edge to be used for sampling based on the counter value.
Figure 9:
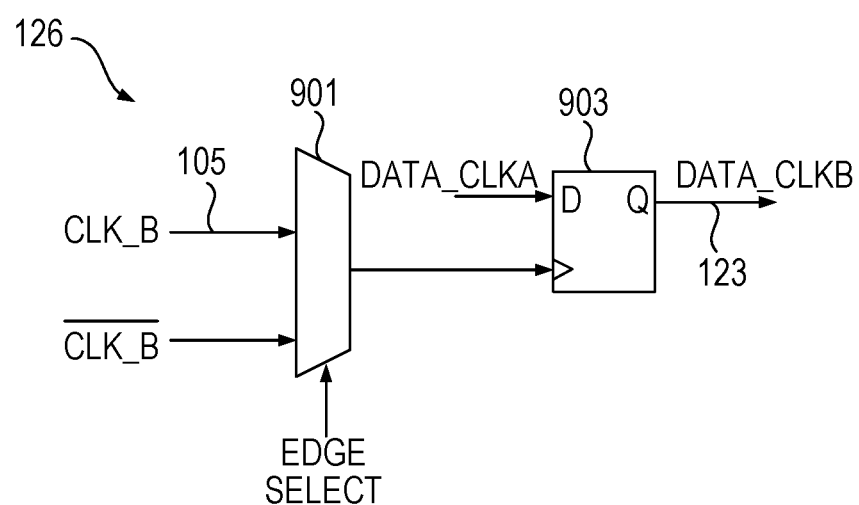
FIG. 9 illustrates an embodiment of a data sampling circuit that includes edge select capability.

In another embodiment, the skew between the A_CLK and the B_CLK can be used to determine which edge of the B_CLK to use to sample the DATA_CLKA from the A_CLK clock domain and avoid use of the FIFO 122 (FIG. 1) entirely thereby speeding up the transfer of data from the CLK_A domain to the CLK_B domain. With reference to FIG. 8, assume an 8 kHz beat frequency with a 125 µs period, a CLK_A having a frequency of 255×8 kHz, and a CLK_B having a frequency of 256×8 kHz. The rising clock edges of CLK_A and CLK_B align every 125 µs at a count value of around 255. The rising edge of CLK_B aligns with the falling edge of CLK_A halfway through the period of the beat frequency at a count value of approximately 127. The count value can be used to control the sampling operation to ensure data is clocked to sample in a manner that avoid transitions in data on the sampling edge. In an embodiment the sampling circuit uses the positive edge of the B_CLK shown for a count range 801 for a count value of 64 to 192 to sample CLK_A domain data DATA_CLKA and for a count range 803 with count values of 193 to 63 the sample circuit uses the negative edge of the B_CLK to sample the CLK_A domain data DATA_CLKA. That ensures that transitions of DATA_CLKA do not occur around the active edge of the sampling clock. Logically, as shown in FIG. 9 in the high level block diagram, in such an embodiment sample circuit 126 includes an edge select circuit 901 that selects CLK_B or CLK_B according to the count value and supplies the appropriate clock to sample DATA_CLKA in flip-flop 903, which in turn supplies DATA_CLKB. While a single flip-flop 903 is shown, embodiments include the number of flip-flops that correspond to the width of DATA_CLKA. Note that more complex sampling control may be utilized in embodiments to ensure during transitions between clock edges that data is not sampled twice or if it is, the extra data is made known to downstream logic.

The data handoff controller 100 includes control logic 131 that provides the control functionality for each of the blocks described herein. For example, the control logic determines the blackout window or edge select control signals based on the count values. The control logic can also include logic to determine the initial value of the counter 115 and control associated with the FIFO. The control functionality may be incorporated into each of the functional blocks rather than being centralized.

In an embodiment, data transfer block 121 supplies a control signal 127 to indicate to downstream filtering functions when data has been added or dropped. Since the A domain and the B domain generate data at different rates, with the B domain at a higher rate, the control signal 127 can be used to indicate a data drop or data addition due to the rate differences. For example, a data addition could repeat a data value or interpolate between several recent data values. A data drop indicates one of the data values was dropped. For embodiments, using the FIFO, FIFO overflow or FIFO empty pointers help to tell the system that the transfers between the clock domains have issues and the system can decide to interpolate, repeat data, or otherwise clear up issues with too much or too little data in the FIFO.

Thus, various approaches have been described to accomplish a data handoff between two clock domains sharing a fundamental beat. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A method transferring data between a first clock domain and a second clock domain comprising:
   receiving a first clock signal with a first frequency and a second clock signal with a second frequency, the first clock signal and the second clock signal sharing a fundamental beat frequency;
   receiving first clock domain data that is synchronous with the first clock signal;
   supplying a count value from a counter indicative of a current skew between the first clock signal and the second clock signal, the counter resetting at the fundamental beat frequency; and
   sampling the first clock domain data using the second clock signal to generate second clock domain data, the sampling based, at least in part, on the count value.

2. The method as recited in claim 1, further comprising: determining a greatest common factor signal indicative of the fundamental beat frequency using the first clock signal and the second clock signal.

3. The method as recited in claim 2, further comprising: resetting the counter based on a frame signal that is generated using the greatest common factor signal, the frame signal indicative of each period of the fundamental beat frequency.

4. The method as recited in claim 2, wherein determining the greatest common factor signal further comprises:
   determining whether the first clock signal is leading or lagging the second clock signal and supplying a lead/lag indicator signal indicative thereof; and
   supplying the lead/lag indicator signal to an edge to pulse conversion circuit to generate a pulse responsive to a value of the lead/lag indicator signal changing.

5. The method as recited in claim 1, further comprising supplying the second clock domain data downstream.

6. The method as recited in claim 1, further comprising clocking the counter with the second clock signal.

7. The method as recited in claim 1,
wherein the counter counts a ratio of the second frequency to the fundamental beat frequency.

8. The method as recited in claim 1, wherein sampling the first clock domain data based at least in part on the count value, comprises:
using a rising edge of the second clock signal to sample the first clock domain data for a first range of values of the counter; and
using a falling edge of the second clock signal to sample the first clock domain data for a second range of values of the counter.

9. The method as recited in claim 1, further comprising:
implementing a black out window based on the count value during which blackout period the first clock domain data is not sampled by the second clock signal.

10. The method as recited in claim 1, further comprising:
supplying a control line to downstream logic to indicate according to a value of the control line a data addition or a data drop in the second clock domain data.

11. An apparatus comprising:
a greatest common factor detect circuit coupled to receive a first clock signal with a first frequency and a second clock signal with a second frequency and supply a greatest common factor signal indicative of a fundamental beat frequency shared between the first clock signal and the second clock signal;
a counter coupled to supply a count value indicative of a skew between the first clock signal and the second clock signal; and
a sampling circuit to supply second clock domain data, the sampling circuit configured to sample first clock domain data with the second clock signal, the first clock domain data being synchronous with the first clock signal, the sampling circuit being controlled to sample, at least in part, based on the count value.

12. The apparatus as recited in claim 11, wherein the greatest common factor detect circuit comprises:
a lead/lag detector circuit to determine whether the first clock signal is leading or lagging the second clock signal and supply a lead/lag signal indicative thereof; and
an edge to pulse conversion circuit to generate a first pulse responsive to the first clock signal changing from leading the second clock signal to lagging the second clock signal.

13. The apparatus as recited in claim 12, wherein the edge to pulse conversion circuit is further configured to generate a second pulse responsive to the first clock signal changing from lagging the second clock signal to leading the second clock signal.

14. The apparatus as recited in claim 11, wherein the counter is clocked with the second clock signal and the second clock signal has a higher frequency than the first clock signal.

15. The apparatus as recited in claim 11, wherein the sampling circuit is configured to sample the first clock domain data using a rising edge of the second clock signal responsive to a first value range of the count value and to sample the first clock domain data using a falling edge of the second clock signal responsive to a second value range of the count value.

16. The apparatus as recited in claim 11, wherein the sampling circuit is configured to not sample data during a blackout window, the blackout window being determined by the count value.

17. The apparatus as recited in claim 16, wherein data is written into a FIFO during the blackout window.

18. The apparatus as recited in claim 11, wherein the counter is reset based on a frame signal that is generated using the greatest common factor signal.

19. A data handoff apparatus, comprising:
a counter coupled to supply a count value indicative of a skew between a first clock signal and a second clock signal, the first and second clock signal having a fundamental beat frequency;
a sampling circuit to supply second clock domain data, the sampling circuit configured to sample first clock domain data with the second clock signal, the first clock domain data being synchronous with the first clock signal; and
wherein the sampling circuit is configured to sample the first clock domain data using a rising edge of the second clock signal responsive to a first value range of the count value and to sample the first clock domain data using a falling edge of the second clock signal responsive to a second value range of the count value.

20. The data handoff apparatus as recited in claim 19 further comprising:
a greatest common factor detect circuit coupled to receive the first clock signal and the second clock signal and supply a signal indicative of the fundamental beat frequency shared between the first clock signal and the second clock signal.

* * * * *